April 7, 1936.

C. E. STARR 2,036,653

BRAKE TESTING MECHANISM

Filed May 23, 1923

INVENTOR
CHARLES E. STARR

BY Charles S. Evans

HIS ATTORNEY.

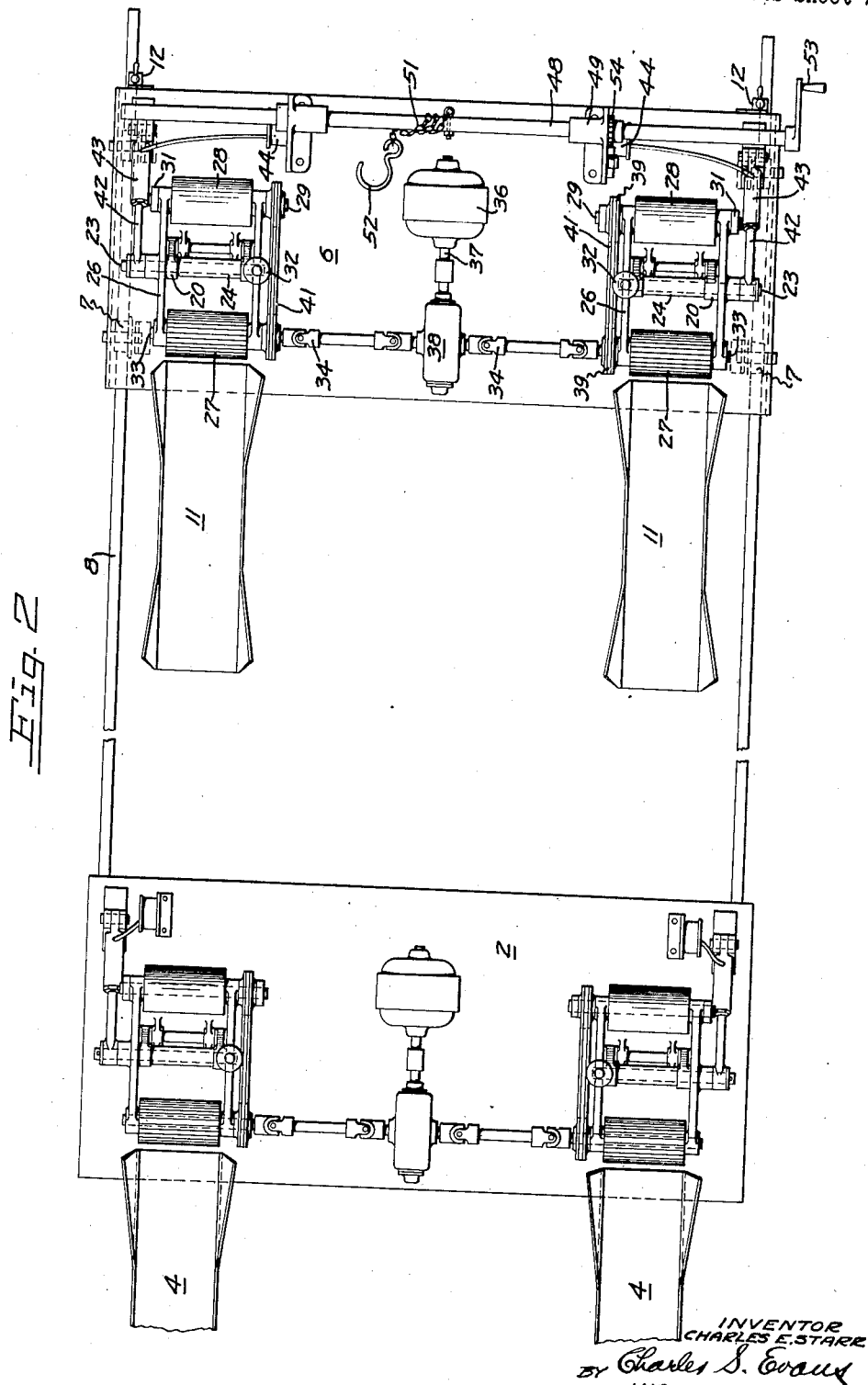

Patented Apr. 7, 1936

2,036,653

UNITED STATES PATENT OFFICE 2,036,653

BRAKE TESTING MECHANISM

Charles E. Starr, Whittier, Calif., assignor to Bendix Aviation Corporation, South Bend, Ind., a corporation of Delaware Application May 23, 1928, Serial No. 279,905

19 Claims. (Cl. 265—25)

My invention relates to machines for testing the effect of a brake on a wheel and is especially adapted for simultaneously testing the brakes of automobiles.

The present invention covers a structure which is a modification of the device illustrated in my copending application Serial No. 211,966 filed August 10, 1927. In the prior application a testing machine is shown having a movable body adapted to support a vehicle wheel. Means are provided for rotating the wheel against the resistance of the brake while being supported by the movable body so that the movement of the supporting body is a function solely of the weight thereon and the force necessary to turn the wheel against the resistance of the plate. Means are provided for evaluating the movement of the supporting body to indicate the condition of the brakes and the amount of adjustment necessary to equalize their effect. The present invention is designed to more equally indicate and evaluate braking effects upon the wheels of a vehicle, equally compensate for unequal distribution of weight and simulate actual driving conditions. Accordingly, as in my prior application, the weight of the vehicle is supported on a plurality of movable bodies to obtain a truer evaluation of the effect of the brakes, the supporting bodies being particularly constructed to give an accurate compensation.

It is a primary object of my invention to provide an apparatus which will readily and accurately indicate the true condition of the brakes and their braking effect upon their associated wheels under substantially road conditions.

Another object of my invention is the provision of an apparatus of the character described which will indicate the degree of brake adjustment required in order to give equal braking effect upon a plurality of wheels while compensating for the unequal distribution of weight on the wheels to be tested if necessary.

Another object of my invention is the provision of means adjacent the testing apparatus for retaining a wheel thereon while being tested.

Another object of my invention is the provision, in an apparatus of the character described, of means for providing a plurality of frictional contact surfaces with the wheel during the testing operation which will give a positive drive and also eliminate the size of the wheel as a variable affecting the operation of the testing device.

A further object of my invention is the provision of an apparatus of the character described for simultaneously testing the brakes of all four wheels of a vehicle such as an automobile.

My invention possesses other objects and valuable features, some of which will be set forth in the following description of my invention. It is to be understood that I do not limit myself to the showing made by the said description, as I may adopt varying forms of my invention within the scope of the claims.

Fig. 2 is a plan view of the apparatus illustrated in Fig. 1.

Figure 1:
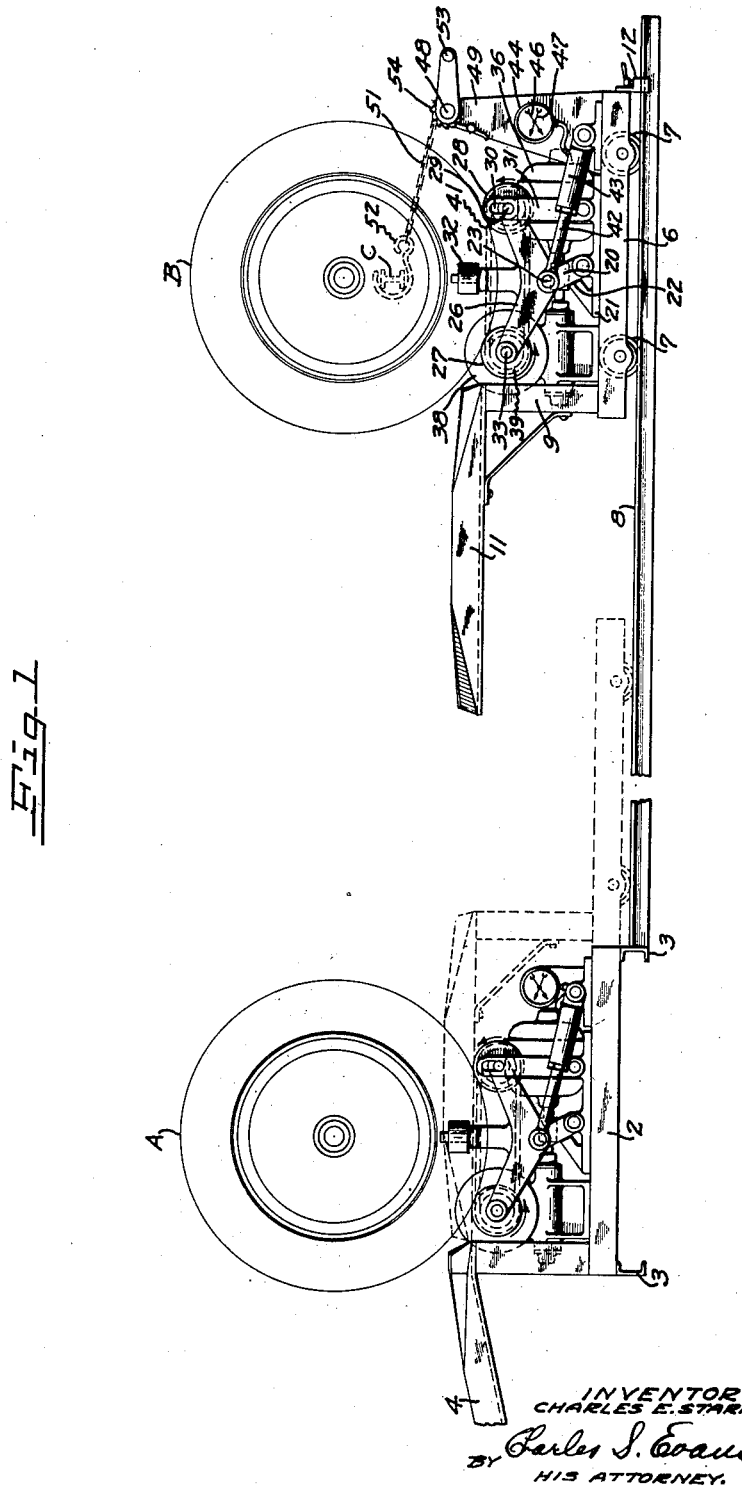
Fig. 1 is a side elevation showing the testing machine and the front and rear wheels of a vehicle supported thereon. The position of the movable carriage for supporting the front wheels of a vehicle is shown in its initial position by dotted lines, and a portion is omitted to shorten the length of the figure.

In greater detail as shown in the illustrated embodiment, my invention comprises a fixed platform 2 mounted on suitable supports such as I-beams 3. The platform serves as a base for the testing machine for one set of wheels of a vehicle such as an automobile. Broadly the testing mechanism comprises two sets of rollers the sets being spaced apart approximately a distance equal to the tread of a vehicle. Each set comprises a pair of spaced rollers arranged with their axes parallel to each other and to the axles of the wheels. The rollers constitute supports for one pair of wheels such as the rear wheel A of a vehicle. A pair of inclined runways 4 are provided one for each pair of rollers extending from the rollers downwardly to the floor upon which the device is placed so that the wheels of the vehicle can be driven thereon. The specific structure of the roller driving and supporting mechanism will be hereafter described.

When both pairs of wheels of an automobile are to be tested simultaneously as is usually desirable, the rollers on platform 2 may be utilized to support the rear wheels of the vehicle and a separate set of rollers may be utilized to support the front wheels as shown in the drawings.

In such an apparatus means are provided for accommodating the testing device to vehicles of various wheel base lengths. For this purpose a pair of rails are attached to the front end of platform 2 and extend forwardly from each side thereof. A movable carriage 6 mounted on wheels 7 is adapted to travel on rails 8. Fixed to the carriage is a testing machine for the second set or front wheels of a vehicle, the testing machine being similar to the mechanism on the stationary platform comprising two pairs of rollers the rollers of the second set being in alignment with the respective rollers on platform 2. The movable carriage is provided with standards 9 extending upwardly from the rear end thereof for supporting runways 11 in position to extend rearwardly in substantially horizontal position and arranged to pass over and rest on each set of rollers mounted on the fixed platform when the carriage is moved into position adjacent the fixed platform as would be the case when the vehicle is first driven on to the testing device.

It is thus apparent when an automobile is driven over the runways 11 resting on the rollers carried by the fixed platform that upon continued movement thereof, the front wheels B will ride up runways 4 over runways 11 and onto the rollers carried by the movable carriage, and rest in position between them. Upon further movement of the vehicle, the carriage will travel forward upon rails 8 until the rear wheels rest between the rear rollers carried by platform 2, and the vehicle is then stopped. With the vehicles in place the movable carriage may be fixed to the rails by means of any suitable mechanism such as the clamp 12. In moving the vehicle off the apparatus, a reversal of the above operation takes place.

The specific testing machine comprising roller supports and indicating mechanism for the fixed and movable supports is the same; therefore, reference only is made in detail to the mechanism mounted on the movable carriage. Inasmuch as the construction of the machine for each wheel of a pair of vehicle wheels is identical, only the part for one wheel will be described.

The carriage has rigidly secured thereto a bearing plate 21 to which is secured at each side thereof a pair of links or arms 20, the arms being pivotally secured to plates 21 at their lower ends. Arms 21 are held in spaced position by means of a shaft or rod 23 and spacer tube or ferrule 24 the rod passing through the upper ends of arms 20 and extending laterally beyond the outer side thereof for reasons which will hereafter appear. Stops 22 are provided on the bearing plate for limiting movement of the arms in one direction. Pivotally carried upon the shaft adjacent each arm are two V-shaped supports 26 between which at the ends thereof are journalled rollers 27 and 28 for engagement with the vehicle wheel. Shaft 29, upon which roller 28 is keyed, projects beyond the supports to form pins engaged by elongated slots 30 in the upper ends of control links 31, which links are pivotally secured at their lower ends for rocking movement to bearing plate 21.

It is preferred to position guide means for maintaining the vehicle wheel on the rollers. Therefore, on the inner support 26 there is journaled a roller 32 to rotate about a vertical axis; so as to rotate upon motion of the wheel and which cooperates with a similar roller upon the other pair of wheel rollers 27 and 28 to prevent lateral movement of the vehicle upon the rollers 27 and 28.

Means are provided for driving the rollers 27 and 28 in rotation together comprising a flexible shaft 33 connected to roller 27 through universal joints 34, as illustrated in Fig. 2, driven by means of a motor 36 mounted on the carriage and through drive shaft 37. The drive shaft is adapted to turn the flexible shaft through any conventional gear reduction system 38 interposed between the shafts. Roller 28 is driven from roller 27 by means of sprockets 39 keyed to the respective roller shafts and a sprocket chain 41 connecting the sprockets. Preferably the gear reduction system 38 is such that the wheels of the vehicle are turned at about 8 to 10 R. P. M. The direction of rotation of the rollers, as indicated by the arrows in Fig. 1, is in a direction opposite to that in which the support and rollers can move from a position of rest. Since the shaft 33 is flexible, it is apparent that it can be driven while the support and rollers move.

Means are provided for yieldingly resisting bodily movement of the supports 26, the rollers mounted thereon and the links 20 in a direction opposite to that in which movement is limited by stops 22 and control links 31. Journaled on the shaft 23 which extends beyond the arms 20 is a piston 42 adapted to slide within the oil filled cylinder 43 pivotally mounted on the carriage. Connected to the cylinder is a pressure gauge 44 for indicating the pressure developed upon compression of the oil in the cylinder.

Preferably the gauge is provided with a pair of pointers 46 and 47, one of which is a free pointer or maximum indicating pointer adapted to move with the other dial and remain at the highest pressure indicated.

*Operation.*—When a vehicle such as an automobile is mounted on the rollers, the motors for each set of wheels are started to turn the rollers of the supports in a direction indicated by the arrows of Fig. 1. As long as the wheel brakes are not applied, the wheels A and B will rotate with the rollers. Upon application of the brakes, resistance to the rotation of the wheels is offered, and the resultant force will cause a movement of the supports and associated rollers 27 and 28 in a direction opposite to that of the rotation of the rollers thereby effecting a lifting of the vehicle which is supported entirely by the bodily movable rollers. Bodily movement of the supports will cause piston 42 to compress oil in the cylinders and the readings can then be taken from the gauges. The differences of the gauge readings will indicate the unequality of braking effect upon the four brakes, and the brake adjustment required to equalize the brakes, consequently the brakes can be adjusted accordingly.

In making the test, it is preferred to equally inflate the tires of the vehicle wheels if they are pneumatic, in order to offer the same frictional resistance for all the rollers.

During the testing operation, the vehicle tends to move off of the apparatus in a direction in which the rollers turn. It is, therefore, preferred to provide means for holding the vehicle from movement during the test. For this purpose a shaft 48 is journaled in suitable bearing supports 49 on the front of the movable carriage. Secured to the shaft and adapted to be wound around it, may be a chain 51 having a hook 52 which is attached to the front axle C of the wheel before the test is made. The shaft then may be turned by means of handle 53 to tighten the chain which is held taut by means of a suitable pawl and ratchet arrangement 54. After the test, the chain is released and the vehicle may be driven off the apparatus.

From the above description, it is apparent that having two driving rollers, mounted on the support which is pivotally mounted for rocking motion, results not only in an increased frictional contact with the wheel giving more positive drive, but also eliminates the size of the wheel as a factor in the indication given. This makes the indication a function of the weight supported by the rollers and the braking effort as the only variables.

I claim:

1. A machine for testing the effect of a brake on a wheel comprising a rockable arm, means for limiting movement thereof in one direction, means for yieldingly resisting movement thereof in an opposite direction, a support pivoted to the arm, a plurality of rollers journaled on said support and adapted for engagement with a braked wheel, and means for driving one of said rollers.

2. A machine for testing the effect of a brake on a wheel comprising a rockable arm, means for limiting movement thereof in one direction, means for yieldingly resisting movement thereof in an opposite direction, a support pivoted to the arm, a plurality of rollers journaled on said support and adapted for frictional engagement with a braked wheel, and means for driving said rollers.

3. A machine for testing the effect of a brake on a wheel comprising a rockable arm, means for limiting movement thereof in one direction, means for yieldingly resisting movement thereof in an opposite direction, means for evaluating the force of said movement, a support pivoted intermediate its length to said arm, a roller journaled on each end of said support and adapted for engagement with a braked wheel, and means for driving one of said rollers.

4. A machine for testing the effect of a brake on a wheel comprising a pivoted arm, means for limiting movement of the arm in one direction, means for yieldingly resisting movement thereof in an opposite direction, a support mounted on said arm, a plurality of rollers journaled on said support and adapted for engagement with a braked wheel, and means for driving one of said rollers.

5. A machine for testing the effect of a brake on a wheel comprising a pivoted arm, means for limiting movement of the arm in one direction, means for yieldingly resisting movement thereof in an opposite direction, a support movably mounted on said arm, means for limiting movement of said support, a plurality of rollers journaled on the support and adapted for engagement with a braked wheel, and means for driving one of said rollers.

6. A machine for testing the effect of a brake on a wheel comprising a pivoted arm, means for limiting movement of the arm in one direction, means for yieldingly resisting movement thereof in an opposite direction, a support pivotally mounted on said arm, a control link for said support, a plurality of rollers journaled on the support and adapted for engagement with a braked wheel, and means for driving one of said rollers.

7. A machine for testing the effect of a brake on a wheel comprising a pivoted arm, means for limiting movement of the arm in one direction, means for yieldingly resisting movement thereof in an opposite direction, a support pivotally mounted on said arm and having a pin thereon, a control link for said support and having a slot therein engaging said pin, a plurality of rollers journaled on said support and adapted for engagement with a braked wheel, and means for driving one of said rollers.

8. A machine for testing the effect of a brake on a wheel comprising a movably mounted arm, means for limiting movement of the arm in one direction, means for yieldingly resisting movement thereof in an opposite direction, a support mounted on said arm, a plurality of rollers journaled on said support and adapted for frictional engagement with a braked wheel, and means for driving said rollers.

9. A machine for testing the effect of the brake on a wheel comprising a rockable support adapted to be placed under the wheel to be tested and mounted for bodily movement relatively to the wheel being tested when in supporting position, a plurality of rollers journalled for rotation on said support and adapted for frictional engagement with a brake wheel and means for driving one of said rollers to rotate the wheel thereon.

10. A machine for testing the effect of the brake on a wheel comprising a rockable support adapted to be placed under the wheel to be tested and mounted for bodily movement relatively to the wheel being tested when in supporting position, a plurality of rollers journalled for rotation on said support and adapted for frictional engagement with a brake wheel, means for driving one of said rollers to rotate the wheel thereon and means to evaluate the bodily movement of said support.

11. In a machine for testing the effect of a brake on a wheel, a pair of spaced rollers for supporting the wheel, means for supporting said rollers for rotation about their axes and for bodily movement in a direction opposed by the weight thereon, means for rotating the rollers in a direction tending to lift the wheel supported thereby and means for evaluating the bodily movement caused by such rotation.

12. A machine for testing the effect of a brake on a wheel comprising a base, a plurality of movable members upon which the wheel rests, a rockable member supporting the movable members, said rockable member being attached to said base for bodily movement relative thereto, means for resisting bodily movements thereof and means for rotating the wheel against resistance to rotation while on said members, whereby movements of said members are a function of the weight of the wheel thereon and of the force for rotating the wheel against resistance.

13. A machine for testing the effect of a brake on a wheel comprising a base, a plurality of movable members upon which the wheel rests, a rockable member supporting the movable members, said rockable member being secured to said base for bodily movement relative thereto, means for resisting bodily movements thereof and means for rotating the wheel against resistance to rotation while on said movable members whereby movements of said members are a function of the weight of the wheel thereon and of the force for rotating the wheel against resistance and indicators for evaluating the movement of said members.

14. A machine for testing the effect of a brake on a wheel comprising a base, a plurality of rollers, a rockable member supporting the rollers, a member pivotally connected to said rockable member and to said base, said rollers being mounted for rotative movement about their axes and for bodily movement, means for resisting bodily movements thereof and means for rotating one of said rollers to rotate the wheels supported thereon against resistance to rotation whereby the bodily movement of said rollers is a function of the weight of the wheel thereon when said wheel is rotated against resistance.

15. A machine for testing the effect of a brake on a wheel comprising a base, a rockable support attached thereto for bodily movement relatively to said base, means for resisting bodily movements of said support, a plurality of rollers journalled on said support and upon which the wheel rests, and means for driving one of said rollers to rotate said wheel against resistance to rotation whereby movements of said support are a function of the weight of the wheel on said support and the force for rotating the wheel against resistance while on said support.

16. A machine for testing the effect of a brake on a wheel comprising a base, a rockable support attached thereto for bodily movement relatively to said base, means for resisting bodily movements of said support, a plurality of rollers journalled on said support and upon which the wheel rests, and means for driving one of said rollers to rotate said wheel against resistance to rotation whereby movements of said support are a function of the weight of the wheel on said support, and the force for rotating the wheel against resistance while on said support and means for evaluating the bodily movement of said rollers while said wheel is being rotated on said support.

17. In a machine for testing the effect of a brake on a wheel comprising a base, a rockable support attached to said base for bodily movements relatively thereto, means for resisting bodily movements thereof, a plurality of rollers journalled on said support and upon which the wheel rests, and means for driving one of said rollers to rotate said wheel while on said support whereby movements of said support are a function of the weight of the wheel on said support and the force for rotating the wheel for resistance while on said support.

18. A vehicle brake tester, comprising a plurality of supporting bodies each designed to carry a wheel of a vehicle, pivotally mounted oscillatable elements supporting said bodies to move the same in an arcuate path from a normal low point of the arc, an indicator for each of said bodies, and a plurality of means actuated by movement of said bodies for operating said indicators.

19. In a brake testing machine, a support for a vehicle wheel, and means for movably mounting said support such as to cause an upward movement of the same against the weight of the vehicle due to brake resistance when a force is applied to the wheel tending to rotate the same.

CHARLES E. STARR.